United States Patent
Hughes et al.

(10) Patent No.: US 7,639,143 B2
(45) Date of Patent: Dec. 29, 2009

(54) METHOD AND APPARATUS FOR VISOSPATIAL AND MOTOR SKILLS TESTING OF PATIENT

(75) Inventors: Robert D. Hughes, Tualatin, OR (US); Terry Dishongh, Portland, OR (US)

(73) Assignee: Intel Corporation, Santa Clara, CA (US)

(*) Notice: Subject to any disclaimer, the term of this patent is extended or adjusted under 35 U.S.C. 154(b) by 323 days.

(21) Appl. No.: 11/529,549

(22) Filed: Sep. 29, 2006

(65) Prior Publication Data

US 2008/0079588 A1    Apr. 3, 2008

(51) Int. Cl.
*G08B 13/14*    (2006.01)
(52) U.S. Cl. .................. 340/572.4; 340/572.8; 342/450; 463/1
(58) Field of Classification Search .............. 340/572.1, 340/572.4, 572.7, 572.8, 10.1, 539.21; 342/450; 463/1, 30, 32
See application file for complete search history.

(56) References Cited

U.S. PATENT DOCUMENTS

| | | | | |
|---|---|---|---|---|
| 5,920,261 A | * | 7/1999 | Hughes et al. | 340/572.1 |
| 6,331,145 B1 | * | 12/2001 | Sity et al. | 463/22 |
| 6,348,856 B1 | * | 2/2002 | Jones et al. | 340/10.1 |
| 6,380,732 B1 | * | 4/2002 | Gilboa | 342/450 |
| 7,218,230 B2 | * | 5/2007 | Wu et al. | 340/572.1 |

FOREIGN PATENT DOCUMENTS

JP    2004230539 A  *  8/2004

* cited by examiner

*Primary Examiner*—Thomas J Mullen
(74) *Attorney, Agent, or Firm*—Pillsbury Winthrop Shaw Pittman LLP

(57) ABSTRACT

A system and method for determining the orientation of an object using one or more RFID tags on the object; and an RFID reader to determine the orientation of the object; wherein the RFID reader is configured to emit a signal to activate at least one of the RFID tags, receive return signals from the RFID tags that are activated, and determine the orientation of the object based on relative signal strengths of the received signals, and the system may be a visospatial testing system.

17 Claims, 8 Drawing Sheets

METHOD AND APPARATUS FOR VISOSPATIAL AND MOTOR SKILLS TESTING OF PATIENT

FIELD OF THE INVENTION

This invention is in the field of using RFID devices to determine the orientation of inventory in warehouses as well as to determine the orientation of blocks during visospatial test testing.

BACKGROUND

Visospatial testing has been performed since the early 1900's to determine intelligence as well as to diagnose certain brain dysfunctions. Popular intelligence tests such as the WAIS-R and the WISC-R tests use multicolored blocks. These tests provide a subject with several blocks which have multicolored patterns on each face of the blocks; the testers then show the subject a pattern that can be made by placing the blocks together in a specific configuration. The subject is then instructed to reorganize the blocks by changing the relative positions and rotational orientations of the blocks such that the top faces of the blocks combine to show a pattern which matches the pattern provided. The testers note the time it takes the subject to form the pattern, as well as the number of times the blocks are incorrectly rotated.

DETAILED DESCRIPTION

Figure 1:
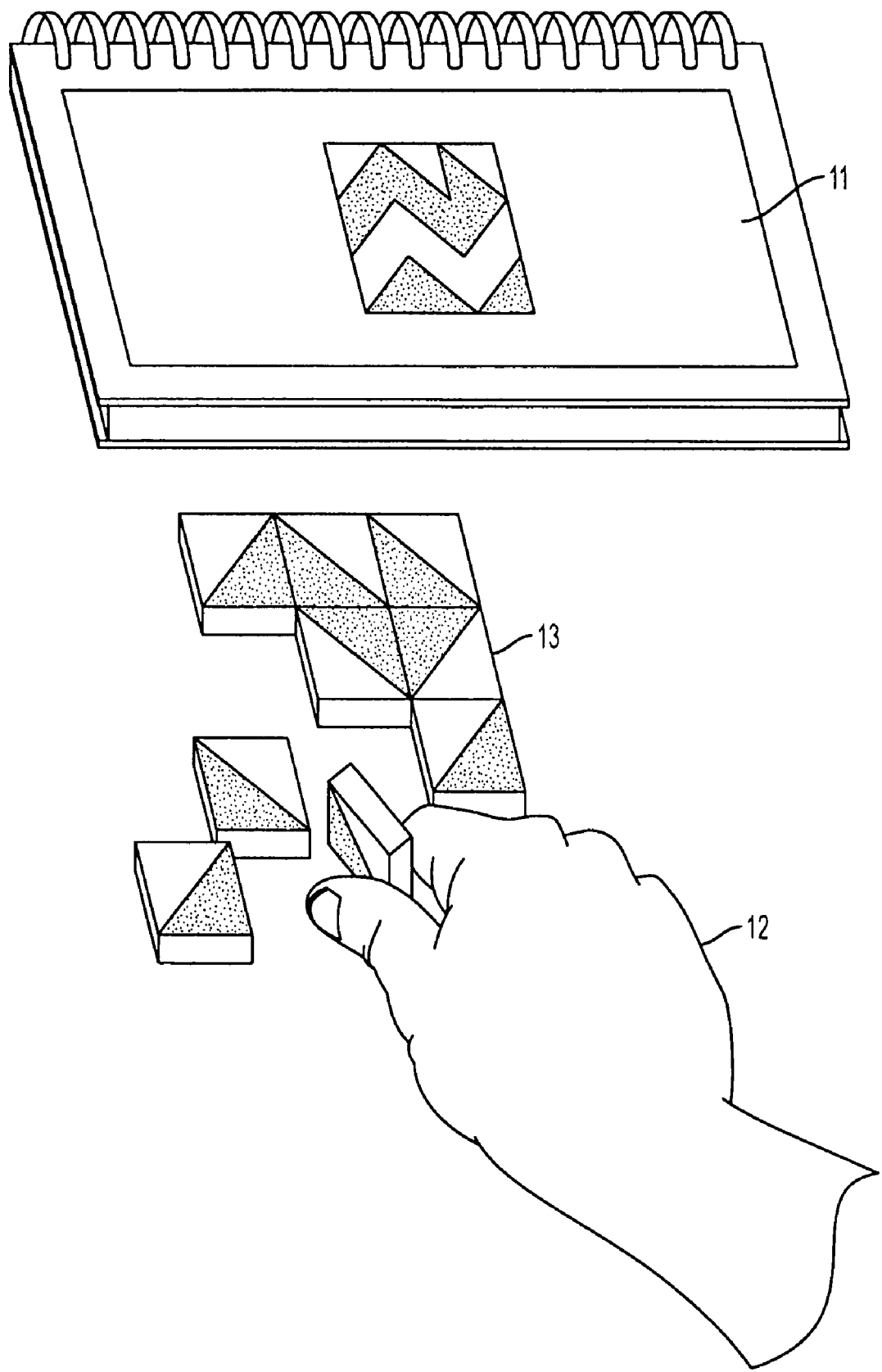
FIG. 1 depicts an example of a set of blocks used in a visospatial test.

As used in the specification and claims, the singular forms "a", "an" and "the" include plural references unless the context clearly dictates otherwise.

According to an embodiment of the invention, an RFID system may comprise an object; one or more RFID tags on the object; and an RFID reader to determine the orientation of the object; wherein the RFID reader is configured to emit a signal to activate at least one of the RFID tags, receive return signals from the RFID tags that are activated, and determine the orientation of the object based on relative signal strengths of the received signals.

According to an embodiment of the invention, an object may further comprise an internal Faraday cage configured to shield at least one RFID tag from the RFID reader based on the orientation of the object such that the shielded RFID tag is not activated by the emitted signal.

According to an embodiment of the invention, a system may further comprise: a processor to process data received by the RFID reader, and a memory to store at least part of the data.

According to an embodiment of the invention, a method may comprise activating at least one of a plurality of RFID tags attached to an object using an RFID reader, such that the RFID tags that are activated emit a response signal; receiving the response signal at the RFID reader; determining a signal strength of the response signal relative to a reference signal strength; and determining the orientation of the object based on the signal strength.

According to an embodiment of the invention, a plurality of RFID tags may be activated, and each of the RFID tags that are activated may emit a response signal.

According to an embodiment of the invention, the reference signal may be a response signal of an RFID tag that is activated.

According to an embodiment of the invention, a method may further comprise processing data received by an RFID reader in a processor, and storing at least part of the data in a memory.

According to an embodiment of the invention, a visospatial testing system may comprising an example pattern, a plurality of blocks, at least one block comprising a plurality of faces having a partial pattern thereon, wherein the blocks may be positioned in at least one configuration such that the partial patterns on upward positioned faces of the blocks form a pattern substantially similar to the example pattern, at least one RFID tag, and an RFID reader to determine the orientation of the blocks, wherein the RFID reader is configured to, emit a signal to activate the RFID tags, receive return signals from the RFID tags that are not shielded by the Faraday cage, and determine the orientation of the blocks based on which RFID tags were activated by the signal.

According to an embodiment of the invention, at least one block may further comprise a Faraday cage provided within the block.

According to an embodiment of the invention, a system may further comprise a processor to process data received by the RFID reader, and a memory to store at least part of the data.

According to an embodiment of the invention, the method may be a method of performing a visospatial test.

According to an embodiment of the invention, a method may further comprise processing data received by the RFID reader in a processor, and storing at least part of the data in a memory.

According to an embodiment of the invention, a table gaming system may comprising a die comprising a plurality of RFID devices and an internal Faraday cage, a gaming surface comprising an RFID reader to emit a signal to activate the RFID tags and to receive a return signal from at least one RFID tag that is activated, and a processor to determine an orientation of the die based on the return signals received by the RFID reader, wherein the internal Faraday cage is configured such that when the die is in a rest state on the gaming surface, only one of the RFID tags in the die is not shielded from the signal emitted by the RFID reader by the Faraday cage.

According to an embodiment of the invention, a system may further comprise two or more dice, each comprising a plurality of RFID tags and an internal Faraday cage.

According to an embodiment of the invention, a system may further comprise a processor to process data recorded by the RFID reader, and a memory to store at least part of the data.

According to an embodiment of the invention, a method may comprise emitting a signal from an RFID reader, activating one of a plurality of RFID tags attached to a die based on the signal emitted by the RFID reader, emitting a return signal from the activated RFID tags, receiving the return signal at the RFID reader, and determining an orientation of the die based on the return signal received by the RFID reader, wherein the die comprises an internal Faraday cage configured such that when the die is in a rest state, only one of the RFID tags is not shielded from the signal emitted by the RFID reader by the Faraday cage.

According to an embodiment of the invention, determining the orientation of the die may be performed using a processor.

According to an embodiment of the invention, a method may be a method of determining which face of the die is facing upward in a table gaming system.

RFID technology is commonly utilized for identifying objects. The heart of an RFID system lies in an information carrying tag called an RFID tag, which functions in response to a coded RF signal received from a base station or an RFID reader. Typically, an RFID tag reflects an incident RF carrier back to the base station or reader, and information is transferred as the reflected signal is modulated by the RFID tag according to its programmed information protocol.

Generally an RFID tag has a semiconductor chip having RF circuits, various logic circuitry, and a memory, as well as an antenna, a collection of discrete components, such as capacitors and diodes, a substrate for mounting the components, interconnections between components, and a physical enclosure. Two types of RFID tags are generally used, active tags, which utilize batteries, and passive tags, which are either inductively powered or powered by RF signals used to interrogate the tags; passive tags do not use a battery.

Generally, passive RF tags contain of two basic parts: an analog circuit which detects and decodes the RF signal and provides power to a digital portion of the tag using RF field strength from the reader, and a digital circuit which implements multiple items of tag identification protocol.

A radio frequency (RF) identification system generally consists of an RF reader and a plurality of RF tags. In a typical configuration, the reader utilizes a processor which issues commands to an RF transmitter and receives commands from the RF receiver. The commands serve to identify tags present in the RF field.

In some implementations, commands exist to gather information from the tags. In more advanced systems, commands exist which output information to the tags. This output information may be held temporarily on the tag, it may remain until written over, or it may remain permanently on the tag.

The RF transmitter of the reader generally encodes commands from the processor, modulates the commands from a base band to the radio frequency, amplifies the commands, and then passes the commands to the RF antenna. The RF receiver receives the signal at an antenna, demodulates the signal from the RF frequency to the base band, decodes the signal, and passes it back to the processor for processing. The reader's antenna is usually capable of transferring RF signals to and from a plurality of tags within the RF signal range.

Radio Frequency Identification is a type of automatic identification method, which utilizes storing and remotely retrieving data using devices called RFID tags or transponders. Chip-based RFID tags generally contain silicon chips and antennas. Passive tags generally do not use an internal power source, whereas active tags generally do incorporate a power source. RFID cards, also known as "proximity" or "proxy" cards, come in three general varieties: passive, semi-passive (also known as semi-active) and active.

Passive RFID tags generally have no internal power supply. A minute electrical current induced in an antenna by incoming radio frequency signals generally provide enough power for an integrated circuit (hereinafter, "IC"), e.g. a CMOS based IC, in the tag to power up and transmit a response. Most passive tags provide a signal by backscattering the carrier signal received from an RFID reader. In order to utilize backscattering, the antenna of a passive RFID tag is generally configured to collect power from the incoming signal and to transmit an outbound backscatter signal. The response of a passive RFID tag is not limited to an ID number (e.g. GUID); many RFID tags contain nonvolatile memory devices, such as EEPROMs, for storing data.

Because passive RFID tags do not generally utilize an onboard power supply, and because they do not require any moving parts, these RFID tags can be very small, and may have a nearly unlimited life span. Commercially available products exist that may be embedded under the skin of a person or animal. For example, RFID tags are commonly smaller than 0.15 mm×0.15 mm×7.5 µm. RFID tags, such as those used by many major retail chains, are often available at a minimal cost. The addition of large antennas for specific applications may result in RFID tags the size of a post card, or perhaps even larger. Common passive RFID tags may commonly be read at distances ranging from about 10 cm to a several meters, depending on the chosen radio frequency and antenna design/size. Due to the simplicity of the design of passive RFID tags, the tags may be suitable for manufacture using a printing process for the antennas.

Non-silicon tags made from polymer semiconductors, having operating frequencies greater than 13.56 MHz, may be used. These polymer tags may be roll printable, like a magazine, and accordingly may be much less expensive than silicon-based tags.

Unlike passive RFID tags, active RFID tags generally have internal power sources which are used to power incorporated ICs that generate an outgoing signal. Active tags may be more reliable (e.g. fewer errors) than passive tags because the active tags may conduct a session with a reader where error correction and/or signal verification may be utilized. Active tags may also transmit at higher power levels than passive tags, allowing them to be more effective in "RF challenged" environments such as water or metal, and over greater distances. Many active RFID tags have practical ranges of hundreds of meters, and a battery life of up to 10 years.

RFID tags may be used with humidity, shock/vibration, light, radiation, temperature, atmospheric and/or other sensors. Active tags typically have longer range (approximately 300 feet) and larger memories than passive tags, as well as the ability to store additional information sent by the transceiver.

In a typical RFID system, an RFID reader may be contain an antenna packaged with a transceiver and decoder. The RFID reader may emit a signal activating the RFID tag so it can read data from and write data to the RFID tag. When an RFID tag passes through the electromagnetic zone, it detects the reader's activation signal and is activated. The reader may then decode the data encoded in the tag's IC and may either store the data of pass the data to a processor.

Depending on the type of system utilizing the RFID reader, application software on a host computer may process the data in a myriad of different ways, e.g. the data may be filtered to reduce redundant readings of the same tag and to form a smaller and more useful data set.

RFID tags may be used to replace UPC or EAN barcodes. Generally, RFID tags have a high data capacity that may be used to store a unique code that may be used to individually track shipped items, in contrast to bar codes which are limited to a single type code for all instances of a particular product. This may help companies to combat theft and other forms of product loss. Moreover, the tracing back of products is an important feature that gets well supported with RFID tags containing not just a unique identity of the tag but also the serial number of the object. This may help companies cope with quality deficiencies and resulting recall campaigns and it also assists in post-sale tracking and profiling of consumers.

A concern surrounding RFID technology is the illicit tracking of RFID tags. Tags which are world-readable pose a risk to both personal location privacy and corporate/military security. More generally, privacy organizations have expressed concerns in the context of ongoing efforts to embed electronic product code (EPC) RFID tags in consumer products.

Some RFID systems may utilize cryptography to prevent tag cloning. Some RFID tags may use a "rolling code" scheme, wherein the tag identifier information changes after each scan, thus reducing the usefulness of observed responses. More sophisticated devices may engage in challenge-response protocols where the tag interacts with the reader. In these protocols, secret tag information is never sent over the insecure communication channel between tag and reader. Rather, the reader issues a challenge to the tag, which responds with a result computed using a cryptographic circuit keyed with some secret value. Such protocols may be based on symmetric or public key cryptography. Cryptographically-enabled tags may have higher cost and power requirements compared to other tags.

An alternate embodiment of the invention relates to determining the orientation of packages in a warehouse. Currently, warehouses are able to tell the location of a package by attaching Radio Frequency Identification (hereinafter, "RFID") tags to the packages. To determine the orientation of the packages, warehouse employees must physically inspect the packages.

Manufacturers, distributors and/or retailers have a need to track their products, and they conventionally attach RFID tags to each product to identify and track their merchandise. By the transmission and reception of radio signals to and from the RFID tags on the products, the products can be tracked from the time of manufacture to the time of sale without any direct visual or physical contact with the product being monitored. Various information may be stored in an RFID tag; for RFID tags attached to products, this information typically includes a retail SKU number (e.g., UPC—universal product code) identifying the name, manufacturer and/or suggested price of the product, a unique serial number identifying the product, or a combination of the SKU number and the unique serial number. Merchants also use SKU numbers to keep track of inventory so that they know which products are selling well and when to reorder products from wholesalers. The unique serial number stored in a RFID tag can be a globally unique number or a number assigned in series to products manufactured in the same product category.

A typical RFID tag on a product includes an antenna and a silicon chip containing modulation circuits, control logic and non-volatile memory. The silicon chip derives electrical power from radio signals received by the antenna or from a battery, and is able to exchange data with a RFID tag scanner by demodulating and modulating the radio signals.

A Faraday cage is an enclosure designed to exclude electromagnetic fields. It is an application of Gauss's law, one of Maxwell's equations. Gauss's law describes the distribution of electrical charge on a conducting form, such as a sphere, a plane, a torus, etc. Intuitively, since like charges repel each other, charge will "migrate" to the surface of the conducting form. The application is named after physicist Michael Faraday, who built the first Faraday cage in 1836, to demonstrate his finding.

Faraday stated that the charge on a charged conductor resided only on its exterior, and had no influence on anything enclosed within it. To demonstrate this fact he built a room coated with metal foil, and allowed high-voltage discharges from an electrostatic generator to strike the outside of the room. He used an electroscope to show that there was no electric charge present on the inside of the room's walls. This shielding effect is used to eliminate the effects of electric fields within a volume, for example to protect electronic equipment from lightning strikes and other electrostatic discharges.

The Faraday cage is sometimes known as a Faraday shield, a term used more generally for any kind of electrostatic shielding.

An idealized hollow electrical conductor may be visualized as an empty sphere or box. If the outside of the cage is an idealized conductor, it will form an equipotential surface, that is to say, its surface will have the same electrical potential at every point. If there is no electrical charge inside the box, then by Gauss' law and the divergence theorem, there should be no electrostatic field inside the equipotential surface, regardless of what the field is outside the box. Since the electrostatic field equations are linear, even field-generating charges in the box will not be affected by any fields outside the box.

A Faraday cage is best understood as an approximation to an ideal hollow conductor. Electric fields produce forces on the charge carriers (usually electrons) within the conductor. As soon as an electric field is applied to the surface of an ideal conductor, it generates a current that causes displacement of charge inside the conductor that cancels the applied field inside.

According to a first exemplary embodiment of the invention, a visospatial testing system may utilize an example pattern to be shown to a test subject; a plurality a blocks, each block having, a plurality of faces having a partial pattern thereon, wherein the blocks may be positioned in at least one configuration such that the partial patterns on upward positioned faces of the blocks form a pattern substantially similar to the example pattern; a plurality of RFID tags, and a Faraday cage provided within the block to block at least some of the RFID tags from an RFID reader; and an RFID reader to determine the orientation of the blocks; wherein the RFID reader; is configured to emit a signal to activate the RFID tags, is configured to receive return signals from the RFID tags that are not shielded by the Faraday cage, and is configured to determine the orientation of the blocks based on which RFID tags were activated by the signal.

The above embodiment provides an inexpensive method and apparatus for performing automated and computer graded visospatial and motor skills testing. While such testing is common in the psychological field for determining the onset of health-related issues or progress towards medical recovery goals, the testing requires a trained tester to spend significant time manually administering the test and interpreting the test results. Due to the precision and the complexity of the testing, the trained testers are typically Ph.D. Physiologist. Because the testing requires such highly trained, and highly paid, professionals, the testing is generally reserved for the very wealthy or the very sick. With the increasing desire to determine a subject's intelligence, as well as detecting possible learning disabilities or dementia; it is desirable to reduce the cost of administering the tests such that they may be more commonly utilized. To that end, the incorporation of RFID technology in the testing is highly beneficial.

Visospatial testing generally utilizes a plurality of blocks having different patterns and/or colors on each of the block's faces. A subject is then shown a pattern and instructed to manipulate the blocks by rotating and rearranging them with respect to one another such that the upward face of the blocks forms the same pattern that was shown to the subject. It is important to the testing results to monitor not only how long a subject takes to form the pattern, but also the iterations and rotations that the subject performs to achieve the correct pattern.

According to various embodiments of the invention, visospatial testing may be automated and the volume and accuracy of the data gathered may be improved by attaching RFID devices to the blocks to aid in determining their orientation. According to further embodiments of the invention, by attaching RFID tags to the blocks used in a visospatial test, an RFID reader may determine both the unique position of a test block and also determine which side of the block is adjacent to a neighboring block thus determining the unique arrangement of two blocks relative to one another. The position of blocks relative to one another and the amount of time it takes a patient to achieve each step are key elements of visospatial and motor skills testing.

FIG. 1 depicts an example of one set of blocks used in psychological testing called Wechsler Blocks. As shown in FIG. 1, an example pattern 11 is shown to a test subject 12. The test subject 12 then manipulates a set of blocks 13 such that the blocks mimic the pattern 11.

Figure 2A:
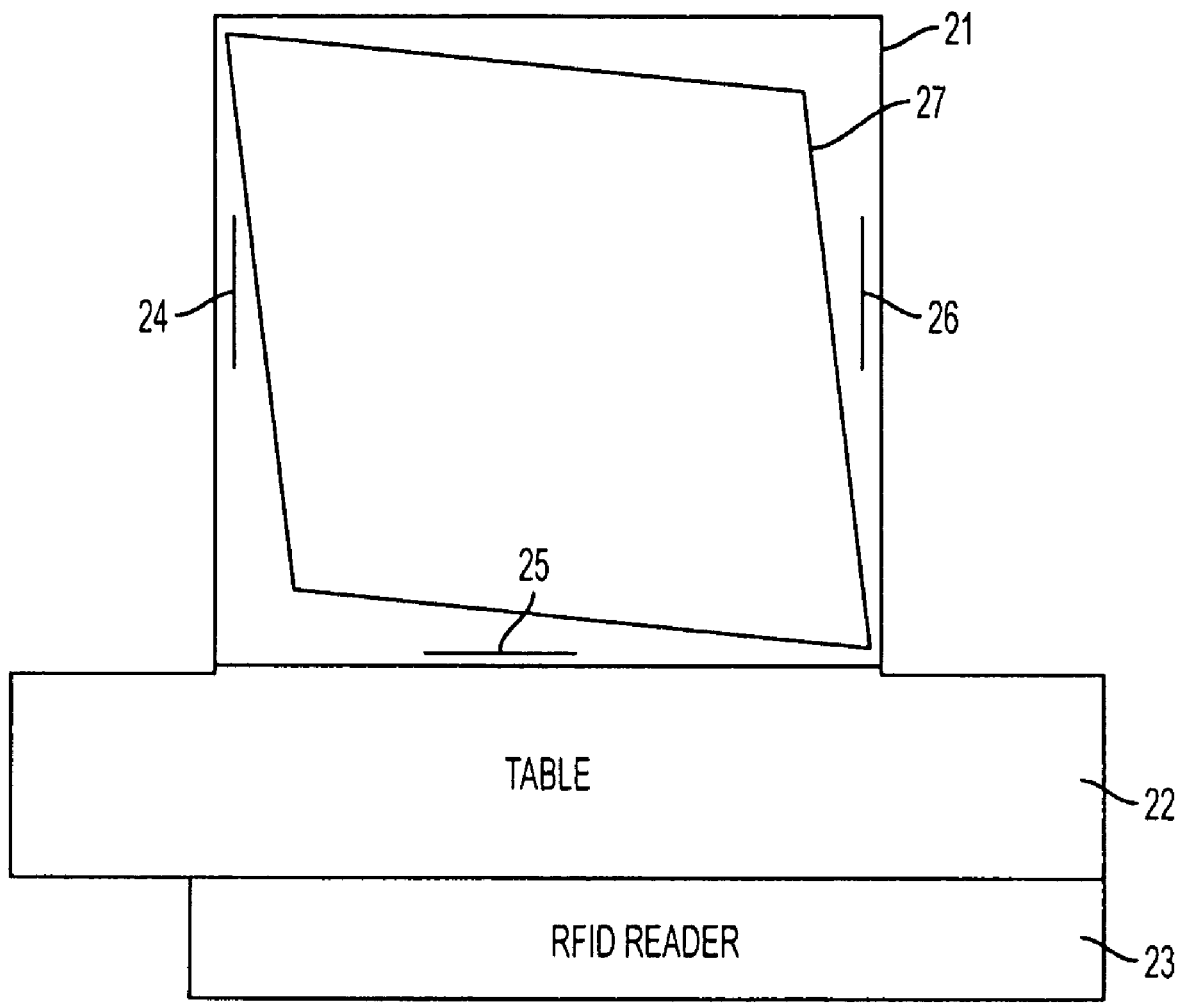
FIG. 2A depicts an example of the positioning of RFID tags on an object and the configuration of an internal Faraday cage, according to an embodiment of the invention.

According to various embodiments of the invention, five RFID tags may be placed on a block having an internal Faraday cage such that the orientation of the block may be determined using a single RFID reader. As seen in FIG. 2A, a cube 21, having RFID tags 24, 25 and 26 attached thereto, and an internal Faraday cage 27 to shield some of the RFID tags from an RFID tag reader depending on the position of the blocks, is placed on a table 22 having an RFID reader 23 located below the table. As shown in FIG. 2A, RFID tags 24 and 25 may be read by the reader 23 while RFID tag 26 is blocked from RF emission to the RFID reader 23 by the Faraday cage 27. Consequently, a processor receiving data from the RFID reader may use the "visible" tags to determine the orientation of the block.

Figure 2B:
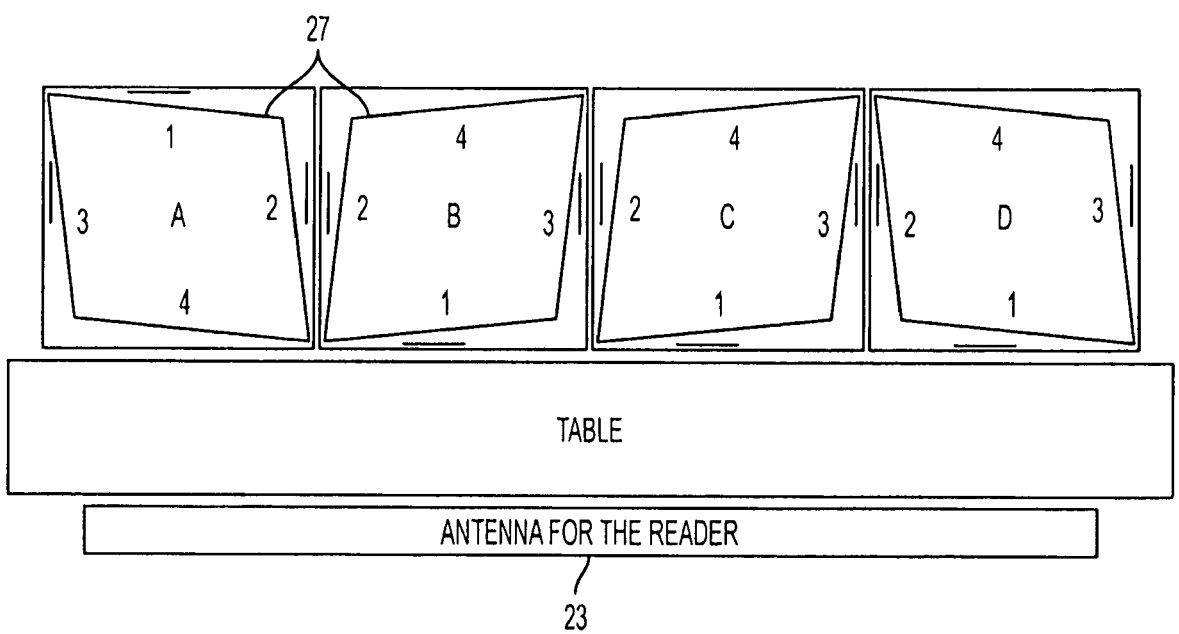
FIG. 2B depicts an exemplary embodiment of the invention in which several blocks are positioned in proximity to one another.

FIG. 2B depicts an exemplary embodiment of the invention in which several blocks A, B, C and D having internal Faraday cages 27 are shown in close proximity to one another. The antenna for the RFID reader 23 may emit an activation signal (if passive RFID tags are used) or may simply receive signals (if active RFID tags are used). Due to the configuration of blocks A-D, the reader 23 senses tags A3, B3, C3 and D2 weakly because the tags are partially blocked from the reader 23 by the internal Faraday cages 27 with the blocks A-D. According to a further embodiment of the invention, tags C2 and D3 may be detected as having a signal that is weaker than those of tags A3, B3, C3 and D2. The reader 23 detects the emission from tags B1, C1 and D1 at greater intensity of electronic emission because they are in closer proximity to the reader 23. In the example shown, there are no tags at positions A-D4. The reader 23 cannot detect tags A2 or B2 because they are fully shielded by the Faraday cages 27. A simple embedded processor, such as may be found in a commercially available reader, calculates which tags can be seen and the receive strengths at which they are seen. With this information, a processor (either in the reader or external to the reader) can determine the orientation of the blocks.

By using various embodiments of the invention, a computer device is able to monitor a test and to log progress through the use of RFID enabled-blocks, thereby allowing a traditionally manual test to be electronically graded and analyzed. Such analysis can provide further benefits that are not generally possible through manual grading methods such as a detailed analysis of a test taker's progress. Furthermore, human error is eliminated from the testing such that more accurate testing is possible.

Alternate applications may be used to monitor the developmental progress of children in arranging blocks or other geometric shapes into specified orders while under the watch of time.

According to various embodiments of the invention, a method of performing a visospatial test my involve: activating at least one of a plurality of RFID tags attached to an object using an RFID reader, such that each of the activated RFID tags emits a response signal; shielding at least one of the RFID tags to prevent activation thereof using a Faraday cage; receiving the response signals at the RFID reader; and determining the orientation of the object based on which RFID tags emit response signals.

A method of performing a visospatial test may further involve processing the received response signals using a processor. According to various embodiments of the invention, the processor may be a computer.

A method of performing a visospatial test may further involve storing the received response signals in a memory. According to various embodiments of the invention, the memory may be a non-volatile storage.

The invention is not limited to use with visospatial testing, according to various further embodiments of the invention, it may be used in any application where the orientation of an object is to be determined.

According to a second exemplary embodiment of the invention, an RFID system to determine the orientation of an object may have a plurality of RFID tags provided on the object; and an RFID reader to determine the orientation of the object; wherein the RFID reader is configured to emit a signal to activate at least one of the RFID tags, to receive return signals from the RFID tags that are activated, and to determine the orientation of the object based on relative signal strengths of the received signals.

According to various embodiments of the invention, a combination of visible RFID tags and the Received Signal Strength Indication (hereinafter, "RSSI") from these visible tags may be used to determine which tags are closest to the reader, and consequently, the orientation of the block. RSSI is a known term in the field of radio engineering, and is a common feature of most radio transceiver systems. In a dielectric medium, the RSSI related to the emission of the radio waves from transmitters is known to decay as a power function as the distance between the transmitter and receiver are increased. In a device and method wherein the medium is known to be a discontinuous dielectric, the decay of the RSSI is reduced to a near linear function of the distance between the receiver and transmitter.

According to one embodiment of the invention, packages to be located in a warehouse or other facility may be equipped with RFID tags in a similar configuration such that the orientation of the packages is able to be determined. For example, a store which shelves hundreds of televisions may desire that all of the boxes be right side up to protect the televisions, and it may also be desirable for a front side of the boxes (which may have a picture of the televisions) face outward. Using an embodiment of the invention, the orientations of the boxes may be determined very quickly and accurately.

According to various embodiments of the invention, the orientation of boxes that cannot be seen may also be verified if each RFID tag also contains unique data to identify the specific package. A reader may verify that it receives a given number of signals (for example three) that all have the same unique identifier. If the reader only receives one or two signals, the reader may determine that the box is not properly oriented.

Figure 3:
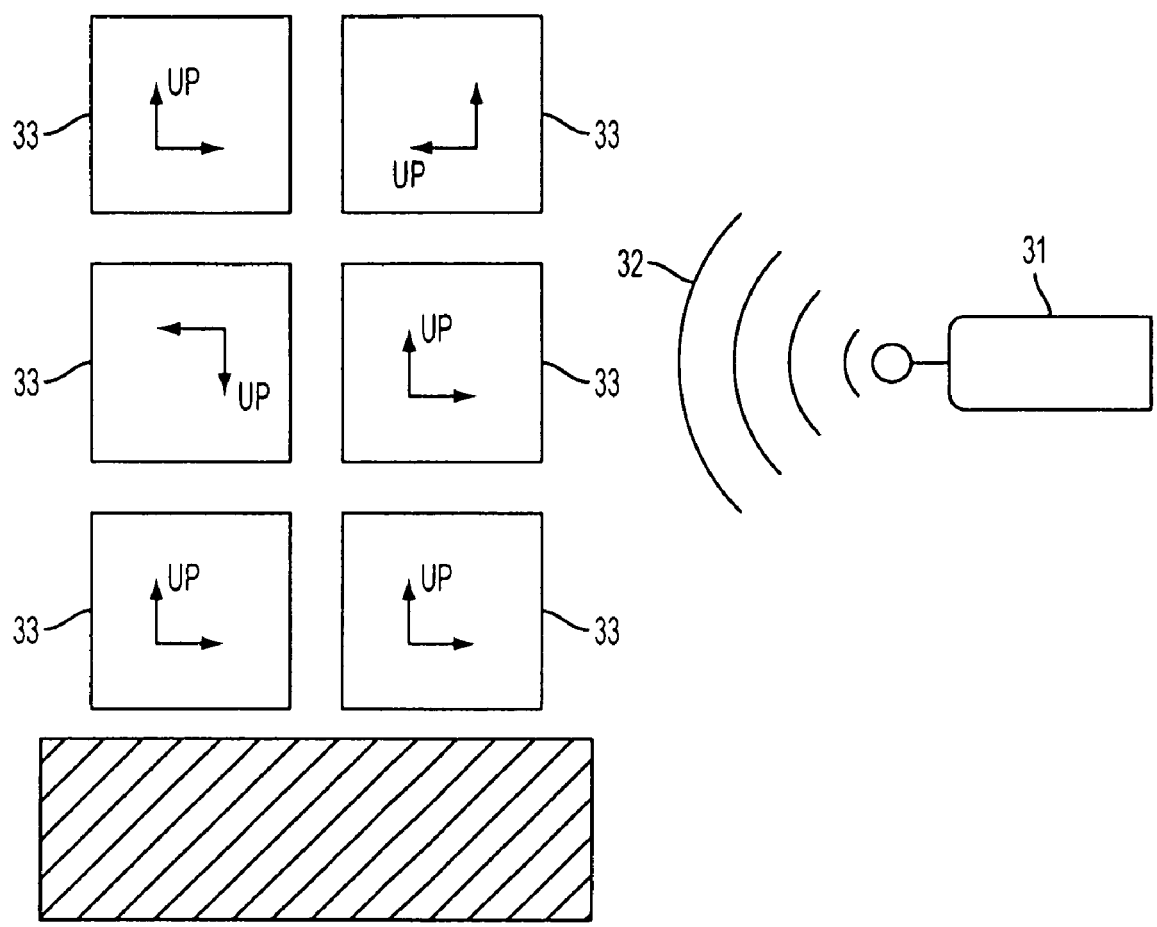
FIG. 3 depicts an example of a system for determining the orientation of packages in a warehouse, according to an embodiment of the invention.

FIG. 3 depicts an example of a system for determining the orientation of packages in a warehouse according to various embodiments of the invention. As shown in FIG. 3, an RFID reader 31, which emits an RFID signal 32, may be used to determine the orientation of boxes 33 to determine not only which boxes are present, but also the orientation of the boxes.

Figure 4:
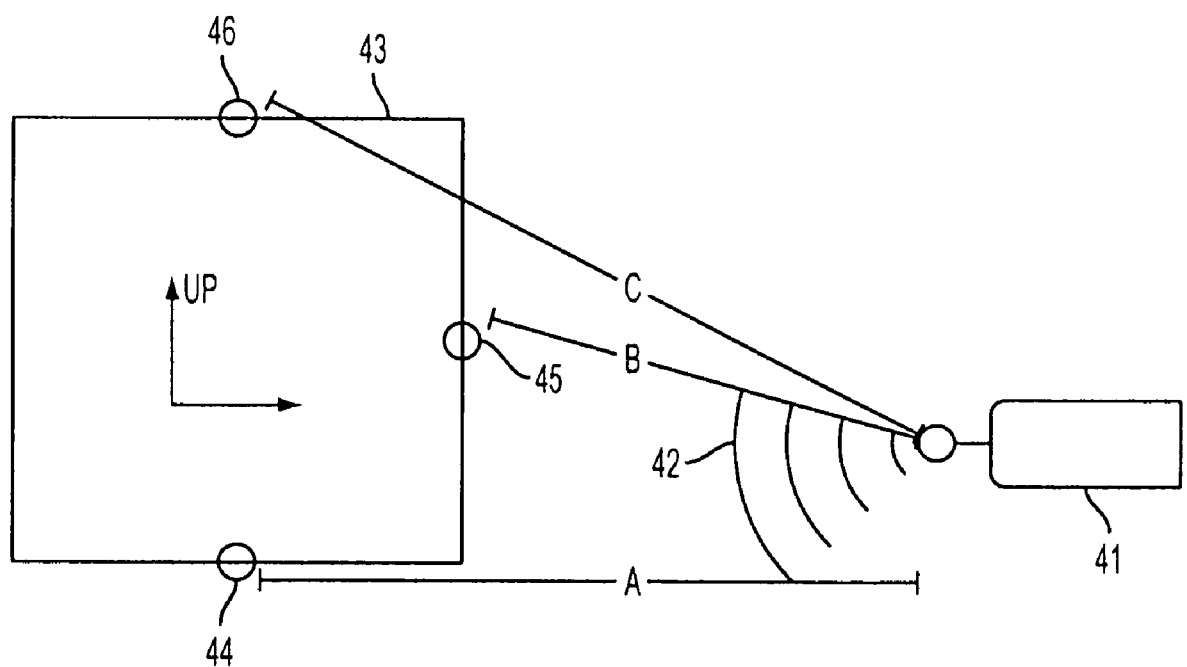
FIG. 4 depicts an example of a case where the orientation of a package is correct, according to an embodiment of the invention.

FIG. 4 depicts an example of a box 43 that is oriented in a preferred manner. As shown in FIG. 4, an RFID reader 41 emits a signal 42 to activate RFID tags 44, 45 and 46 attached to box 43. The distances between the reader 41 and the RFID tags 44, 45 and 46 are shown by distances A, B and C, respectively. When the box is positioned near the reader is able to determine from the RSSI that B<A<C. The position of the RFID tags again is determined through using RSSI and the Faraday cage which internally shields some of the tags from the reader. If the two parallel planes of the cube have opposingly positioned Faraday Cages, then the RFID reader will only detect the non-shielded tag and the closest tag through RSSI differentiation. Accordingly, the RSSI differentiation in combination with the tags being shielded enable the system to determine the side of the cube closest to the reader and the orientation of the box.

Figure 5:
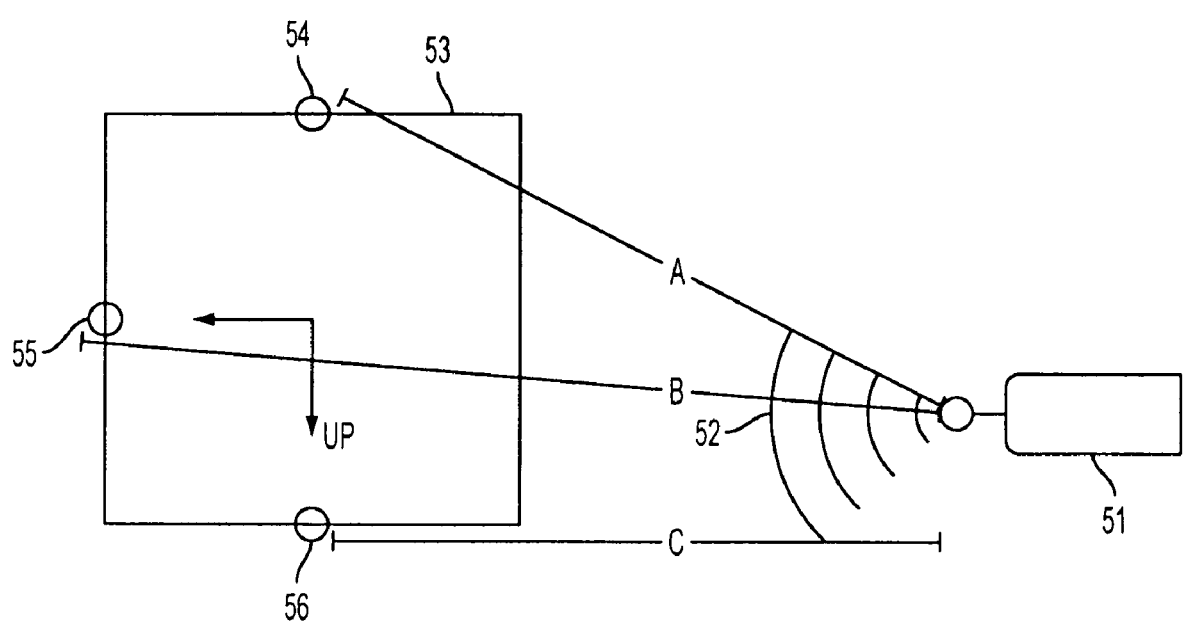
FIG. 5 depicts an example of a case where the orientation of a package is incorrect, according to an embodiment of the invention.

However, if as shown in FIG. 5, a box 53 is positioned incorrectly, an RFID reader 51, which emits a signal 52, will determine from the RSSI that C<B<A. Accordingly, the RFID reader 51 will alert a user that the box is incorrectly oriented. According to a further embodiment of the invention, the RFID reader 51 will also be able to determine from a SKU or a unique identifier what the contents of the box are and if the box needs to be correctly oriented immediately, or even if the contents of the box need to be inspected.

While the above examples according to variations on the second exemplary embodiment of the invention do not utilize Faraday cages, such cages may be used in conjunction with the above described embodiments to determine the configuration of the boxes.

According to various embodiments of the invention, a method of determining an orientation of an object may involve: activating at least one of a plurality of RFID tags attached to an object using an RFID reader, such that each of the activated RFID tags emits a response signal; receiving the response signals at the RFID reader; determining relative signal strengths of the response signals; determining the orientation of the object based on the relative signal strengths of the response signals.

A method of determining an orientation of an object may further involve processing the received response signals using a processor. According to various embodiments of the invention, the processor may be a computer.

A method of determining an orientation of an object may further involve storing the received response signals in a memory. According to various embodiments of the invention, the memory may be a non-volatile storage.

According to a third exemplary embodiment of the invention, a table gaming system, may have a die comprising a plurality of RFID devices and an internal Faraday cage; a gaming surface comprising an RFID reader to emit a signal to activate the RFID tags and to receive a return signal from at least one activated the RFID tag; and a processor to determine an orientation of the die based on the return signals received by the RFID reader, wherein the internal Faraday cage is configured such that when the die is in a rest state on the gaming surface, only one of the RFID tags in the die is not shielded by the Faraday cage from the signal emitted by the RFID reader.

For example, if a craps table were equipped with a reader and set of dice equipped with RFID tags and internal Faraday cages, according to an embodiment of the invention, a casino could instantly determine the orientation of the dice. That is to say, it may be instantly determined which face of each die is facing upwards. Not only would this simplify keeping track of the numbers shown, but data could be collected during the tumbling of the dice-and analyzed to determine if the dice were not behaving as expected due to tampering. Additionally, such a system could keep track of which gaming chips (which may contain additional RFID tags) are placed where on the table. By having all of this information available, a casino could instantly determine the results of each roll and appropriate payouts to the players. This system would also be able to monitor any possible cheating that occurs.

Figure 6:
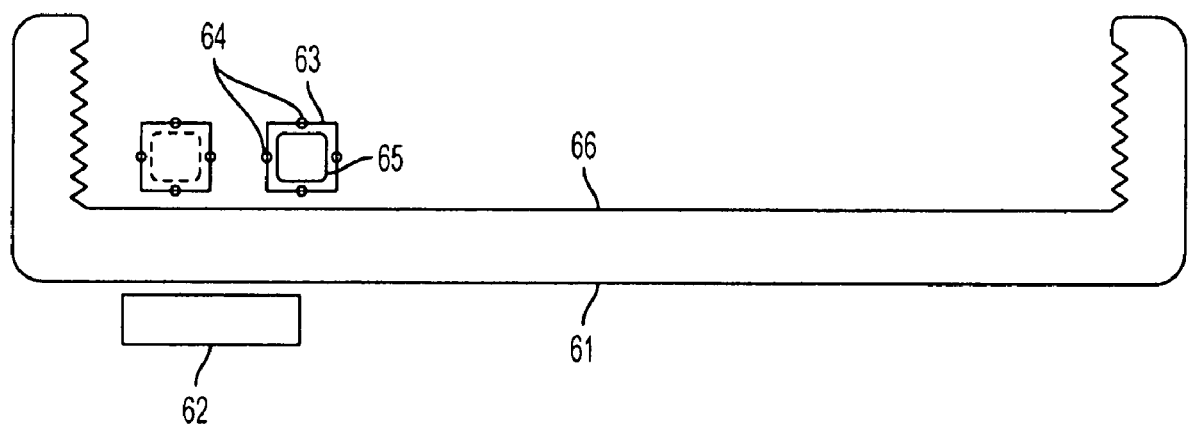
FIG. 6 depicts an example of an RFID system for determining the orientation of a set of dice on a gaming table, according to an embodiment of the invention.

FIG. 6 depicts an example of a gaming table 61, having an RFID reader 62 located under a gaming surface 66. Using a die 63, having several RFID tags 64 embedded in the die around an internal Faraday cage 65, the RFID reader 62 is able to determine what face of the die is showing. Because the Faraday cage 65 is able to block the uppermost RFID tag 64 from receiving a signal from the RFID reader 62 and therefore being activated, the RFID reader 62 can determine which side of the die is facing up. According to various aspects of the invention, this information may be tracked and analyzed to determine if a die is faulty as well as to determine winning rolls.

Figure 7:
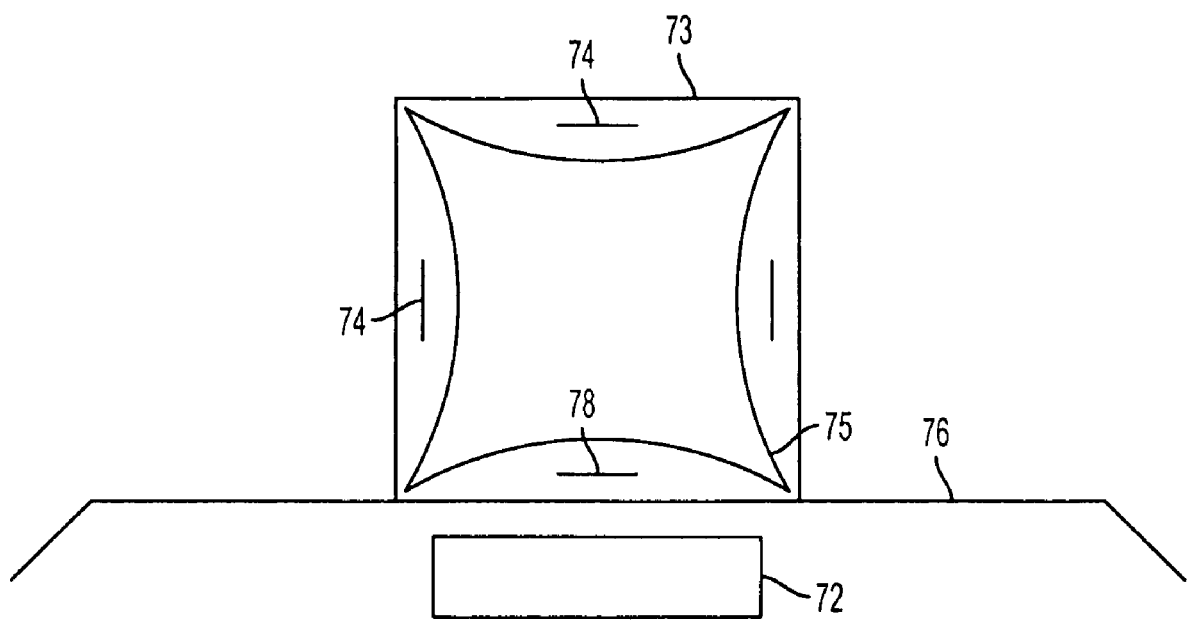
FIG. 7 depicts an example of a die having an internal Faraday cage, according to an embodiment of the invention.

FIG. 7 depicts an example of a die having an internal Faraday cage, according to an embodiment of the invention. As shown in FIG. 7, a die 73 is at rest on a gaming surface 76 which is equipped with an RFID reader 72. The die 73 is equipped with RFID tags 74 and 78, as well as an internal Faraday cage 75. As shown in the figure, the Faraday cage 75 is shaped such that only the downward facing RFID tag may be activated by the RFID reader 72. The other RFID tags 74 are shielded from the RFID reader 72 by the internal Faraday cage 75.

While FIG. 7 depicts a system in which only the upward face of the die is determinable, one of ordinary skill in the art would understand based on the disclosure that the system may be modified to more particularly determine the orientation of the die.

According to various embodiments of the invention, a gaming system may use a plurality of dice, each containing a plurality of RFID tags and an internal Faraday cage.

According to various embodiments of the invention, a method of determining which face of a die is facing upward in a table gaming system may involve: emitting a signal from an RFID reader; activating one of a plurality of RFID tags attached to a die based on the signal emitted by the RFID reader; emitting a return signal from the activated RFID tags; receiving the return signal at the RFID reader; and determining an orientation of the die based on the return signal received by the RFID reader, wherein the die comprises an internal Faraday cage configured such that when the die is in a rest state, only one of the RFID tags is not shielded from the signal emitted by the RFID reader by the Faraday cage.

According to further embodiments of the invention, a method of determining which face of a die is facing upward in a table gaming system may also involve determining the orientation of the die using a processor. In some embodiments, the processor may be a computer.

According to various embodiments of the invention, a method of determining which face of a die is facing upward in a table gaming system may involve storing the determined orientation in a memory. The memory may be a non-volatile memory.

We claim:

1. An RFID system, comprising:
an object;
  one or more RFID tags on the object; and
  an RFID reader to determine the orientation of the object;
  wherein the RFID reader is configured to:
    a) emit a signal to activate at least one of the one or more RFID tags,
    b) receive return signals from the at least one of the one or more RFID tags that are activated, and
    c) determine the orientation of the object based on relative signal strengths of the received signals,
wherein the object further comprises:
an internal Faraday cage configured to shield at least one RFID tag from the RFID reader based on the orientation of the object such that the shielded RFID tag is not activated by the emitted signal.

2. The system of claim 1, further comprising:
a processor to process data received by the RFID reader, and
a memory to store at least part of the data.

3. A method, comprising:
activating at least one of a plurality of RFID tags attached to an object using an RFID reader, such that the RFID tags that are activated emit a response signal;
receiving the response signal at the RFID reader;
determining a signal strength of the response signal relative to a reference signal strength of a reference signal; and
determining the orientation of the object based on the signal strength of the response signal.

4. The method of claim 3, wherein each of the at least one of the plurality of RFID tags that are activated emits a response signal.

5. The method of claim 3, wherein the reference signal is a response signal of an RFID tag that is activated.

6. The method of claim 3, further comprising:
processing data received by the RFID reader in a processor, and
storing at least part of the data in a memory.

7. The method of claim 3, wherein the method is a method of performing a visospatial test.

8. The method of claim 7, further comprising:
processing data received by the RFID reader in a processor, and
storing at least part of the data in a memory.

9. A visospatial testing system, comprising:
1) an example pattern;
2) a plurality of blocks, at least one block comprising:
  a) a plurality of faces having a partial pattern thereon, wherein the at least one blocks may be positioned in at least one configuration such that the partial pattern on an upward positioned faces of the at least one block forms a pattern substantially similar to the example pattern; and
  b) at least one or more RFID tags, and
3) an RFID reader to determine the orientation of the blocks;
wherein the RFID reader is configured to:
  a) emit an activating signal to activate the at least one or more RFID tags,
  b) receive return signals from the at least one or more RFID tags that are not shielded by a Faraday cage, and
  c) determine the orientation of the blocks based on which of the at least one or more RFID tags were activated by the activating signal.

10. The system of claim 9, wherein the at least one block further comprises a Faraday cage provided within the block.

11. The system of claim 9, further comprising:
a processor to process data received by the RFID reader, and
a memory to store at least part of the data.

12. A table gaming system, comprising:
a die comprising a plurality of RFID tags and an internal Faraday cage;
a gaming surface comprising an RFID reader to emit a signal to activate the RFID tags and to receive a return signal from at least one RFID tag that is activated; and
a first processor to determine an orientation of the die based on the return signals received by the RFID reader,
wherein the internal Faraday cage is configured such that when the die is in a rest state on the gaming surface, only one of the RFID tags in the die is not shielded from the signal emitted by the RFID reader by the Faraday cage.

13. The system of claim 12, further comprising:
two or more dice, each comprising a plurality of RFID tags and an internal Faraday cage.

14. The system of claim 12, further comprising:
a second processor to process data recorded by the RFID reader, and
a memory to store at least part of the data.

15. A method, comprising:
emitting a signal from an RFID reader;
activating one or more RFID tags attached to a die based on the signal emitted by the RFID reader;
emitting a return signal from the one or more activated RFID tags;
receiving the return signal at the RFID reader; and
determining an orientation of the die based on the return signal received by the RFID reader,
wherein the die comprises an internal Faraday cage configured such that when the die is in a rest state, only one of the one or more RFID tags is not shielded from the signal emitted by the RFID reader by the Faraday cage.

16. The method of claim 15, wherein determining the orientation of the die is performed using a processor.

17. The method of claim 15, wherein the method is a method of determining which face of the die is facing upward in a table gaming system.

* * * * *